United States Patent
Baba et al.

(10) Patent No.: US 8,876,007 B2
(45) Date of Patent: Nov. 4, 2014

(54) RFID TAG

(71) Applicants: Fujitsu Limited, Kawasaki (JP); Fujitsu Frontech Limited, Inagi (JP)

(72) Inventors: Shunji Baba, Yokohama (JP); Shigeru Hashimoto, Inagi (JP); Yoshiyasu Sugimura, Inagi (JP); Tsuyoshi Niwata, Inagi (JP); Mimpei Miura, Inagi (JP)

(73) Assignees: Fujitsu Limited, Kawaski (JP); Fujitsu Frontech Limited, Tokyo (JP)

( * ) Notice: Subject to any disclaimer, the term of this patent is extended or adjusted under 35 U.S.C. 154(b) by 19 days.

(21) Appl. No.: 13/827,088

(22) Filed: Mar. 14, 2013

(65) Prior Publication Data

US 2013/0277433 A1 Oct. 24, 2013

(30) Foreign Application Priority Data

Apr. 18, 2012 (JP) .................................. 2012-095154

(51) Int. Cl.
*G06K 19/02* (2006.01)
*G06K 19/077* (2006.01)

(52) U.S. Cl.
CPC .... *G06K 19/07728* (2013.01); *G06K 19/07749* (2013.01)
USPC ......................................... 235/488; 235/492

(58) Field of Classification Search
USPC .................. 235/488, 487, 492; 340/572.1
See application file for complete search history.

(56) References Cited

U.S. PATENT DOCUMENTS

| | | |
|---|---|---|
| 2005/0101060 A1 | 5/2005 | Tsunoda et al. |
| 2006/0290514 A1 | 12/2006 | Sakama et al. |
| 2008/0036609 A1 | 2/2008 | Baba et al. |
| 2010/0130288 A1* | 5/2010 | Shigeta .......................... 463/47 |

FOREIGN PATENT DOCUMENTS

| | | |
|---|---|---|
| EP | 1887493 A2 | 2/2008 |
| EP | 2131393 A1 | 12/2009 |
| EP | 2187344 A1 | 5/2010 |
| EP | 2506192 A2 | 10/2012 |
| JP | 2004-362341 | 12/2004 |
| JP | 2005-116771 | 4/2005 |
| JP | 2007-4323 | 1/2007 |
| JP | 2008-159007 | 7/2008 |
| JP | 2009-135605 | 6/2009 |

OTHER PUBLICATIONS

Patent Abstracts of Japan, Publication No. 2004-362341, Published Dec. 24, 2004.

(Continued)

*Primary Examiner* — Sonji Johnson
(74) *Attorney, Agent, or Firm* — Staas & Halsey LLP

(57) ABSTRACT

An RFID tag includes a first flexible sheet covering a surface of a base part, an antenna and an IC chip; a second flexible sheet covering an another surface of the base part; a first reinforcing member including third and fourth sheets and covering the chip and a connecting portion of the chip and the antenna, the third sheet having flexibility and elasticity and being disposed on the first sheet, the fourth sheet having flexibility and being disposed on the third sheet; a second reinforcing member including fifth and sixth sheets and covering the chip and the connecting portion, the fifth sheet having flexibility and elasticity and being disposed on the second sheet, the sixth sheet having flexibility and being disposed on the fifth sheet; and an outer member having flexibility and elasticity and covering the first and the second sheets and the first and the second reinforcing members.

8 Claims, 6 Drawing Sheets

(56) References Cited

OTHER PUBLICATIONS

Patent Abstracts of Japan, Publication No. 2005-116771, Published Apr. 28, 2005.
Patent Abstracts of Japan, Publication No. 2007-004323, Published Jan. 11, 2007.
Patent Abstracts of Japan, Publication No. 2008-159007, Published Jul. 10, 2008.
Patent Abstracts of Japan, Publication No. 2009-135605, Published Jun. 18, 2009.
Extended European Search Report issued Aug. 5, 2013 in corresponding European Patent Application No. 13159814.6.

* cited by examiner

RFID TAG

CROSS-REFERENCE TO RELATED APPLICATION

This patent application is based upon and claims the benefit of priority of the prior Japanese Patent Application No. 2012-095154 filed on Apr. 18, 2012, the entire contents of which are incorporated herein by reference.

FIELD

The present invention is related to an RFID tag.

BACKGROUND

FIG. 1A is a diagram illustrating a conventional RFID tag 1 in plan view. FIG. 1B is a diagram illustrating an A-A cross section of the RFID tag as illustrated in FIG. 1A.

A Radio Frequency Identifier (RFID) tag 1 is a type of an RFID tag which can be fitted on goods such as clothes that are flexible and are worn by people.

As illustrated in FIGS. 1A and 1B, the RFID tag 1 includes an inlay 2 and a cover 3 which covers the inlay 2 and is made of gum elastic.

The inlay includes a base 4, an antenna 5, an IC chip 6, a chip reinforcing body 7 and a backside reinforcing body 8.

The base 4 is made of a PET film. The antenna 5 is a type of an antenna for communication and is formed onto the base 4. The IC chip 6 is electrically connected to the antenna 5 and performs wireless communication via the antenna 5.

The chip reinforcing body 7 is made of a fiber reinforced resin and surrounds the IC chip 6. The chip reinforcing body 7 and the IC chip 6 are adhered onto the top surface of the base 4 by a thermosetting adhesion bond 9.

The backside reinforcing body 8 is made of a fiber reinforced resin in a similar fashion to the chip reinforcing body 7 and is adhered onto the bottom surface of the inlay 2 by the thermosetting adhesion bond 9.

Conventionally, there has been a film antenna including a conductive circuit which is made of metal and is formed onto at least one surface of a film that is made of modified polyolefin treated with unsaturated carboxylic acid. The modified polyolefin treated with unsaturated carboxylic acid provides electrical insulation properties.

Patent Document 1: Japanese Patent Application Publication No. 2008-159007
Patent Document 2: Japanese Patent Application Publication No. 2009-135605

SUMMARY OF THE INVENTION

The RFID tag can be fitted on goods such as sheets or towels professionally used at hotels and napkins or hand towels professionally used at restaurants for example, besides the goods that are worn by people.

In order to use the sheets or the like over and over again, for example, they are collected from the hotels and the restaurants by a laundry service provider and are returned to the owners after being washed at the laundry service provider.

Since the laundry service provider washes a large amount of laundry such as sheets or the like, the laundry service provider associates the laundry with names or addresses of the owners of the laundry every time the laundry is collected by the laundry service provider from the owners.

Since the laundry service provider handles an enormous amount of information such as the names of the owners, the laundry service provider manages the information easily and effectively by attaching the RFID tags to the laundry and by using identifiers of the RFID tags, for example.

However, for example, when the laundry service provider extracts water from the laundry after washing them with water, the laundry service provider may use an extracting machine in order to facilitate efficiency of extraction. The extracting machine includes a huge piston and a huge container, and extracts water from lots of the laundry in the container by pressing them with the piston. Hereinafter the way of the extraction as described above is referred to as a "press extraction".

The diameters of the piston and the container may be a few meters, for example, in a case where the container has a cylindrical hollow shape. Since a pressure applied to the laundry by the piston may be ranging from 30 kgf/cm$^2$ to 50 kgf/cm$^2$, for example, the extraction is performed at a very severe condition for the RFID tags.

When the press extraction of the laundry fitted with the RFID tags that include the base made of the PET film or the reinforcing body made of the fiber reinforced resin is performed, the base or the reinforcing body may be broken by the pressure.

In a case where the base made of the PET film is broken, the antenna of the RFID tag may be broken. In a case where the reinforcing body made of the fiber reinforced resin is broken, the IC chip of the RFID tag may be broken. In any of these cases, there is a problem in that the RFID tag may be broken.

In a case where the press extraction is performed repeatedly, the problem as described above may occur with goods other than the sheets, etc., in a similar manner.

Herein, the conventional film antenna can be bent. Even if an RFID tag is manufactured by mounting the IC chip onto the film antenna, the RFID tag is not capable of withstanding the press extraction in a case where the RFID tag does not include an IC chip protecting member.

Even if the IC chip protecting member is attached to the RFID tag, the RFID tag is not capable of withstanding repeated press extraction in a case where the IC chip protecting member is made of hard material. In this case, the IC chip protecting member may be broken by repeated press extraction.

As described above, the conventional RFID tag has low durability.

SUMMARY

An RFID tag according to an embodiment of the present invention includes a base part having flexibility, an antenna configured to be formed on a surface of the base part, an IC chip configured to be mounted on the surface of the base part and electrically connected to the antenna, a first sheet having flexibility and configured to cover the surface of the base part, the antenna and the IC chip, a second sheet having flexibility and configured to cover an another surface of the base part, a first reinforcing member configured to include a third sheet and a fourth sheet and to cover the IC chip and a connecting portion of the IC chip and the antenna, the third sheet having flexibility and elasticity and being disposed on the surface of the first sheet, the fourth sheet having flexibility and being disposed on the third sheet, a second reinforcing member configured to include a fifth sheet and a sixth sheet and to cover the IC chip and the connecting portion of the IC chip and the antenna, the fifth sheet having flexibility and elasticity and being disposed on a surface of the second sheet, the sixth sheet having flexibility and being disposed on the fifth sheet, and an outer member having flexibility and elasticity and being configured to cover the first sheet, the second sheet, the first reinforcing member and the second reinforcing member.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

A description is given, with reference to the accompanying drawings, of embodiments of an RFID tag.

Embodiment

Figure 1A:
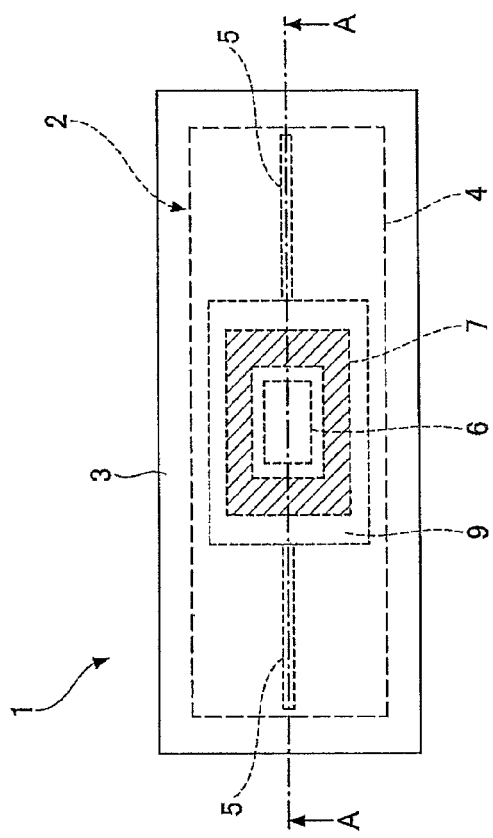
FIG. 1A is a diagram illustrating a conventional RFID tag 1 in plan view.
Figure 1B:
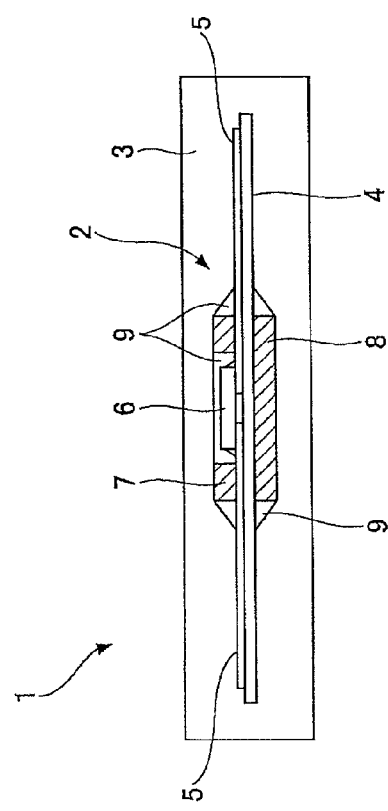
FIG. 1B is a diagram illustrating an A-A cross section of the RFID tag as illustrated in FIG. 1A.
Figure 2A:
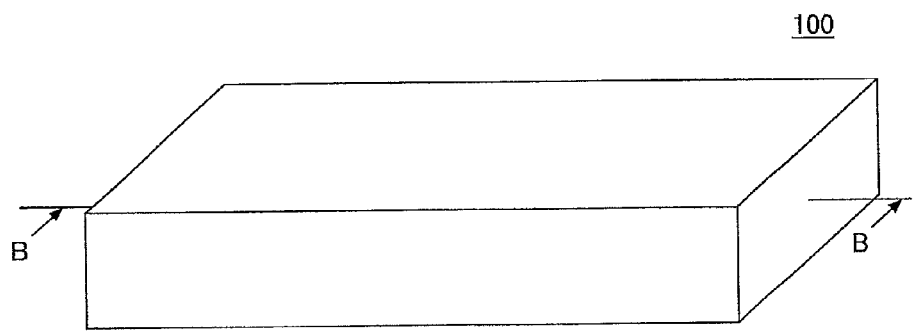
FIG. 2A is a diagram illustrating an oblique perspective view of an RFID tag of an embodiment.
Figure 2B:
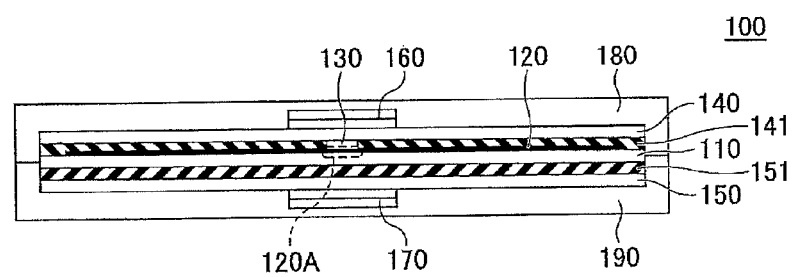
FIG. 2B is a diagram illustrating a B-B cross section of the RFID tag as illustrated in FIG. 2A.
Figure 2C:
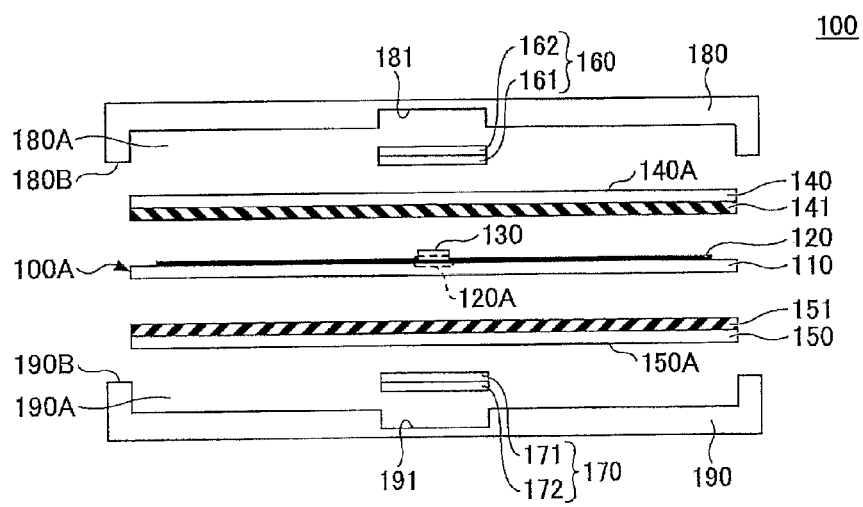
FIG. 2C is a diagram illustrating an exploded view of the RFID tag.

FIG. 2A is a diagram illustrating an oblique perspective view of an RFID tag 100 of the present embodiment. FIG. 2B is a diagram illustrating a B-B cross section of the RFID tag 100 as illustrated in FIG. 2A. FIG. 2C is a diagram illustrating an exploded view of the RFID tag 100. FIG. 2C illustrates a cross section corresponding to the cross section as illustrated in FIG. 2B.

As illustrated in FIGS. 2A to 2C, the RFID tag 100 includes a base 110, an antenna 120, an IC chip 130, inner covers 140 and 150, reinforcing members 160 and 170, and outer covers 180 and 190.

In the following, an upper surface as illustrated in FIGS. 2A to 4E is referred to as a front surface, and a lower surface as illustrated in FIGS. 2A to 4E is referred to as a rear surface. However, the definition of the front surface and the rear surface is used as a matter of convenience. The front surface and the rear surface do not mean a universal positional relationship.

The base 110 is a type of a sheet-like member which is formed in a sheet shape and has flexibility. The base 110 is one example of a base part. The antenna 120 is formed onto one of the surfaces of the base 110. The IC chip 130 is mounted on the same surface of the antenna 120 as the one onto which the antenna 120 is formed.

A PET (Polyethylene Terephthalate) film may be used as the base 110, for example. The base 110 may be formed by an extrusion or the like, for example.

The base 110 may not be limited to the PET film, a polypropylene film or a film made of vinyl chloride may be used as the base 110, for example.

The antenna 120 is formed onto the front surface of the base 110. The antenna 120 may be made of a silver paste, for example. The silver paste may be a paste-like material which is made by mixing silver powders into a thermosetting resin. The antenna 120 may be formed by applying the silver paste onto the front surface of the base 110 and heating the silver paste so that the silver paste is thermally hardened.

A pattern of the antenna 120 in plan view will be hereinafter described in detail with reference to FIGS. 3A and 3B.

The IC chip 130 is mounted onto the front surface of the base 110 and is electrically connected to the antenna 120.

When the IC chip 130 receives a read signal included within an RF (Radio Frequency) band from a reader/writer of the RFID tag 100 via the antenna 120, the IC chip 130 receives power from the read signal. Then the IC chip 130 operates and sends identifier information via the antenna 120 by using the power. Thus, the reader/writer can read the identifier information of the RFID tag 100.

The base 110, the antenna 120 and the IC chip 130 constitute an inlet 100A.

The inner covers 140 and 150 are sheet-like members having flexibility and are disposed onto the front surface and the rear surface of the base 110, respectively. The inner covers 140 and 150 are bonded to the front surface and the rear surface of the base 110 by adhesive layers 141 and 151, respectively.

The inner cover 140 covers and protects the antenna 120 and the IC chip 130 disposed on the front surface of the base 110. The inner cover 150 covers the rear surface of the base 110 and protects the antenna 120 and the IC chip 130 via the base 110.

The inner covers 140 and 150 are examples of a first sheet part and a second sheet part, respectively. PET films may be used as the inner covers 140 and 150, for example. The inner covers 140 and 150 may be formed by an extrusion or the like, for example.

Acrylic adhesive tapes may be used as the adhesive layers 141 and 151, for example.

The sizes of the inner covers 140 and 150 are equal to that of the base 110 in plan view. The inner covers 140 and 150 and the base 110 have the same size in order to protect the antenna 120 and the IC chip 130 that are mounted onto the base 110.

The reinforcing member 160 is bonded onto a portion of the front surface 140A of the inner cover 140 in which the IC chip 130 and a connecting portion 120A of the IC chip 130 and the antenna 120 are located in plan view. In other words, the reinforcing member 160 covers the IC chip 130 and the connecting portion 120A of the IC chip 130 and the antenna 120 via the inner cover 140.

The reinforcing member includes a rubber sheet 161 and a film 162. The rubber sheet 161 of the reinforcing member 160 is bonded onto the front surface 140A of the inner cover 140.

Accordingly, the rubber sheet 161 and the film 162 are stacked onto the front surface 140A of the inner cover 140 in this order. Acrylic adhesive tapes may be used in order to bond the reinforcing member 160 onto the front surface 140A of the inner cover 140, for example.

The reinforcing member 160 is larger than the IC chip 130 in plan view. In other words, the size (dimension) of the reinforcing member 160 is larger than that of the IC chip 130 in plan view. The reinforcing member 160 is bonded onto the front surface 140A of the inner cover 140 so that the IC chip 130 is located almost in the middle of the reinforcing member 160 in plan view.

The size of the reinforcing member 160 is preferably more than four times greater than that of the IC chip 130 in plan view. The reinforcing member 160 and the IC chip 130 have the sizes as described above so that the reinforcing member 160 can fully cover the IC chip 130.

In a case where the IC chip 130 measures 0.5 mm×0.5 mm in plan view and is 0.1 mm thick, the reinforcing member 160 measures 7 mm×7 mm in plan view, for example. The rubber sheet 161 and the film 162 have the same size as described above in plan view. The rubber sheet 161 is 0.1 mm thick and the film 162 is 0.25 mm thick, for example.

It is preferable that the thickness of the rubber sheet 161 is greater than or equal to that of the IC chip 130. The rubber sheet 161 and the IC chip 130 have a relationship of the thicknesses as described above so that the rubber sheet 161 can absorb a bump, which is formed on the inner cover 140 that is relatively pressed by the IC chip 130, between the inner cover 140 and the film 162. A technique of the rubber sheet 161 which absorbs the bump will be described later.

The reinforcing member 160 is one example of a first reinforcing member, the rubber sheet 161 is one example of a third sheet having elasticity and flexibility, and the film 162 is one example of a fourth sheet having flexibility.

The rubber sheet 161 may be made a material having elasticity and flexibility. For example, the rubber sheet 161 may be made of a material having entropic elasticity. The entropic elasticity includes rubber elasticity and elastomer elasticity, for example. Thus, for example, rubber material which has rubber elasticity or elastomer material which has elastomer elasticity may be used as material of the rubber sheet 161 having flexibility and elasticity.

A silicone (silica-ketone) rubber, butyl rubber, a nitrile rubber, a nitrile hydride rubber, a fluoride rubber, an epichlorohydrin rubber, an isoprene rubber, a chlorosulfonated polyethylene rubber or a urethane rubber may be used as the rubber material, for example.

An elastomer of vinyl chloride series, styrene series, olefin series, ester series, urethane series or amide series may be used as the elastomer material, for example.

Herein, the material of the rubber sheet 161 is not limited to a member which is made of the materials described above and is not limited to the member which has entropic elasticity, as long as the material of the rubber sheet 161 has flexibility and elasticity.

The rubber sheet 161 is formed by calendering performed by a calender machine or extrusion, etc.

The film 162 may be made a material having flexibility. For example, the film 162 may be made of a PET film. The film 162 has flexibility. The film 162 may be made of a film other than a PET film. The film 162 may be made of a polypropylene film or a vinyl chloride film, for example.

The reinforcing member 160 is fitted in a concave portion 181 which is formed inside of the outer cover 180 which will be described hereinafter.

The reason why the rubber sheet 161 and the film 162 of the reinforcing member 160 are stacked onto the front surface 140A of the inner cover 140 in this order is as follows.

Since the reinforcing member 160 is provided onto the inner cover 140 in order to protect the IC chip 130 and the connecting portion 120A of the IC chip 130 and the antenna 120, it is necessary for the reinforcing member 160 to have a certain strength. Thus, the reinforcing member 160 includes the film 162.

However, the inner cover 140 is made of a member which has a certain strength and is not deformable such as a PET film, for example, and the film 162 is made of a PET film, for example, similar to the inner cover 140.

If the film 162 is bonded onto the inner cover 140 directly, a stress is not absorbed between the inner cover 140 and the film 162. And then an excessive stress may be applied to the IC chip 130, in a case where the RFID tag 100 is deformed by a pressure or a stress which is applied to the RFID tag 100 from outside.

Accordingly, the rubber sheet 161 is provided between the inner cover 140 and the film 162. It becomes possible to absorb or disperse the stress or the pressure between the inner cover 140 and the film 162 by providing the rubber sheet 161 between the inner cover 140 and the film 162 when the RFID tag 100 is deformed by the pressure or the stress.

In a case where the RFID tag 100 is bent in a U-shape or where a stress is applied to the RFID tag 100 in the direction of the thickness, the inner cover 140 is relatively pressed by the IC chip 130 and the bump occurs on the inner cover 140. The bump is formed on the inner cover 140 by the IC chip 130. It becomes possible to cause the rubber sheet 161 to absorb the bump formed onto the inner cover 140 by providing the rubber sheet 161 between the inner cover 140 and the film 162.

As a result, it becomes possible to reduce the stress applied to the IC chip 130 and the connecting portion 120A of the IC chip 130 and the antenna 120.

According to the reasons as described above, the rubber sheet 161 is provided between the inner cover 140 and the film 162. In other words, the reinforcing member 160 which is bonded onto the front surface 140A of the inner cover 140 is divided into the rubber sheet 161 and the film 162, and the reinforcing member 160 is bonded onto the inner cover 140 by bonding the rubber sheet 161 onto the front surface 140A of the inner cover 140.

The reinforcing member 170 is bonded onto a portion of the rear surface 150A of the inner cover 150 in which the IC chip 130 and the connecting portion 120A of the IC chip 130 and the antenna 120 are located in plan view. In other words, the reinforcing member 170 covers the IC chip 130 and the connecting portion 120A of the IC chip 130 and the antenna 120 via the inner cover 150.

The reinforcing member 170 includes a rubber sheet 171 and a film 172. The rubber sheet 171 of the reinforcing member 170 is bonded onto the rear surface 150A of the inner cover 150. The rubber sheet 171 and the film 172 are stacked onto the rear surface 150A of the inner cover 150 in this order. Acrylic adhesive tapes may be used in order to bond the reinforcing member 170 onto the rear surface 150A of the inner cover 150, for example.

The reinforcing member 170 has the same dimensions as those of the reinforcing member 160. The reinforcing member 170 is bonded onto the rear surface 150A of the inner cover 150 so that the IC chip 130 is located almost in the middle of the reinforcing member 170 in plan view in a similar manner to that of the reinforcing member 160.

The reinforcing member 170 measures 7 mm×7 mm in plan view. The rubber sheet 171 and the film 172 have the same size as described above in plan view. The rubber sheet 171 is 0.1 mm thick and the film 172 is 0.25 mm thick, for example.

The reason why the rubber sheet 171 and the film 172 of the reinforcing member 170 are bonded onto the rear surface 150A of the inner cover 150 in this order is similar to the reason why the rubber sheet 161 and the film 162 of the reinforcing member 160 are bonded onto the front surface 140A of the inner cover 140 in this order.

The reinforcing member 170 is one example of a second reinforcing member, the rubber sheet 171 is one example of a fifth sheet having elasticity and flexibility, and the film 172 is one example of a sixth sheet having flexibility.

The rubber sheet 171 may be made a material having elasticity and flexibility. For example, the rubber sheet 171 may be made of a material having entropic elasticity. A material similar to that of the rubber sheet 161 may be used for forming the rubber sheet 171.

The film 172 may be made a material having flexibility. For example, the film 172 may be made of a PET film. The film 172 has flexibility. The film 172 may be made of a film other than a PET film. The film 172 may be made of a polypropylene film or a vinyl chloride film, for example.

The reinforcing member 170 is fitted in a concave portion 191 which is formed inside of the outer cover 190 which will be described hereinafter.

The outer cover 180 is disposed onto the inner cover 140 and the reinforcing member 160 and covers the inner cover 140 and the reinforcing member 160. The outer cover 180 includes a concave portion 180A which is depressed from bottom side of a cuboid of the outer cover 180 and a peripheral portion 180B. The peripheral portion 180B is formed along the outer periphery of the outer cover 180 and has a rectangular loop-like shape in plan view. The peripheral portion 180B surrounds the concave portion 180A in plan view. The concave portion 181 is formed in the middle of a depressed surface of the concave portion 180A. The concave portion 181 is formed in order to hold the reinforcing member 160.

The outer cover 180 may be made a material having elasticity and flexibility. For example, the outer cover 180 may be made of a material having entropic elasticity. The entropic elasticity includes rubber elasticity and elastomer elasticity, for example. Thus, for example, rubber material which has rubber elasticity or elastomer material which has elastomer elasticity may be used as material of the outer cover 180 having flexibility and elasticity.

A silicone (silica-ketone) rubber, butyl rubber, a nitrile rubber, a nitrile hydride rubber, a fluoride rubber, an epichlorohydrin rubber, an isoprene rubber, a chlorosulfonated polyethylene rubber or a urethane rubber may be used as the rubber material, for example.

An elastomer of vinyl chloride series, styrene series, olefin series, ester series, urethane series or amide series may be used as the elastomer material, for example.

Herein, the material of the outer cover 180 is not limited to a member which is made of the materials described above and is not limited to the member which has entropic elasticity, as long as the material of the outer cover 180 has flexibility and elasticity.

The outer cover 180 is formed by calendering performed by a calender machine or extrusion etc.

The outer cover 190 is disposed onto the inner cover 150 and the reinforcing member 170 and covers the inner cover 150 and the reinforcing member 170. The outer cover 190 includes a concave portion 190A which is depressed from upper side of the cuboid of the outer cover 190 and a peripheral portion 190B. The peripheral portion 190B is formed along the outer periphery of the outer cover 190 and has a rectangular loop-like shape in plan view. The peripheral portion 190B surrounds the concave portion 190A in plan view. The concave portion 191 is formed in the middle of a depressed surface of the concave portion 190A. The concave portion 191 is formed in order to store the reinforcing member 170.

The outer cover 190 is made of a material having elasticity and flexibility. A material similar to that of the outer cover 180 may be used for forming the outer cover 190.

The outer covers 180 and 190 seal the base 110, the antenna 120, the IC chip 130, the inner covers 140 and 150, and the reinforcing member 160 and 170 by bonding the peripheral portion 180B and the peripheral portion 190B with each other. The peripheral portions 180B and 190B may be bonded by an adhesive material, for example. The outer covers 180 and 190 are examples of outer member. Acrylic adhesive tapes may be used as the adhesive material, for example. Otherwise, the peripheral portions 180B and 190B may be bonded by thermal adhesion.

In the following, the inlet 100A will be described by referring to FIGS. 3A and 3B.

Figure 3A:
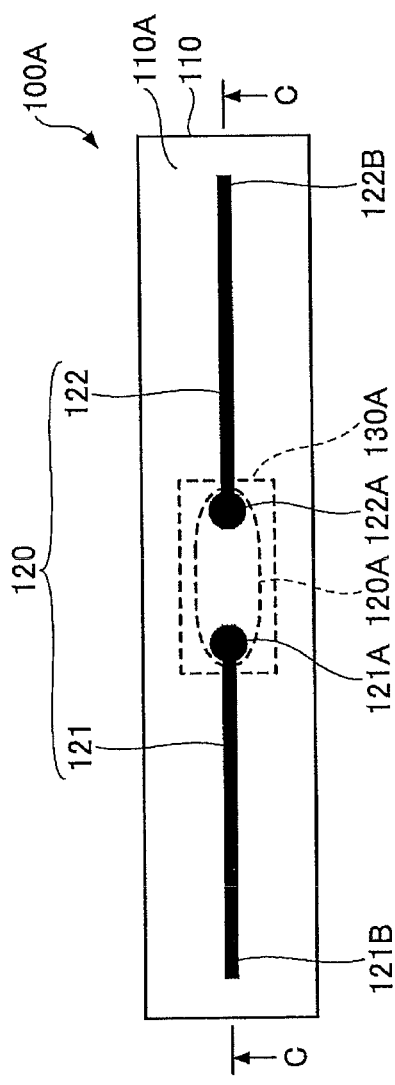
FIG. 3A is a diagram illustrating an inlet of the RFID tag in plan view in a state before mounting an IC chip.

FIG. 3A is a diagram illustrating the inlet 100A of the RFID tag 100 in plan view in a state before mounting the IC chip 130. FIG. 3B is a diagram illustrating a cross section of the IC chip 130 and a peripheral portions of the IC chip 130. FIG. 3B illustrates an enlarged view of the C-C cross section of the inlet 100A as illustrated in FIG. 3A.

The inlet 100A of the RFID tag 100 according to the present embodiment includes the base 110, the antenna 120 and the IC chip 130.

The antenna 120 is formed by printing the silver paste on the front surface 110A of the base 110 as illustrated in FIG. 3A, for example. The antenna 120 is a type of a dipole antenna and includes antenna portions 121 and 122.

Lengths of the antenna portions 121 and 122 may correspond to a communication frequency of the RFID tag 100. Since frequency bands of 952 MHz to 954 MHz or 2.45 GHz are assigned for the communication of the RFID tags in Japan, for example, length of the antenna portions 121 and 122 between edges 121B and 122B may be set to a half length of wavelength λ at the communication frequency of the RFID tag 100. Since frequency bands of 915 MHz and 868 MHz are assigned for the RFID tags in the United States and Europe (EU) respectively, for example, the length of the antenna portions 121 and 122 may be set to a half length of wavelength λ at the communication frequency of the RFID tag 100.

Herein, an area 130A in which the IC chip 130 is to be mounted is represented by a dotted line. A pair of terminals of the IC chip 130 that is connected to the antenna 120 is connected to a terminal 121A of the antenna portion 121 and a terminal 122A of the antenna portion 122.

Figure 3B:
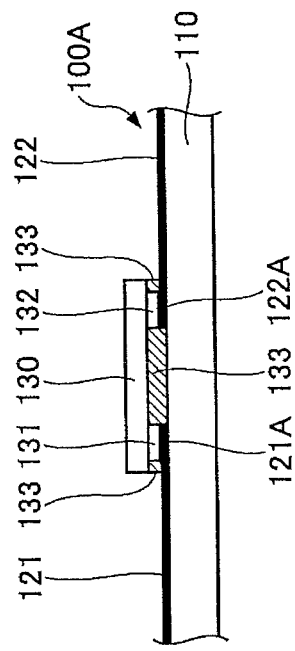
FIG. 3B is a diagram illustrating a cross section of the IC chip and a peripheral portions of the IC chip.

As illustrated in FIG. 3B, the IC chip 130 is mounted on the front surface 110A by flip-chip bonding, and the terminals of the IC chip 130 that are used for communication are connected to the antenna 120. The IC chip 130 is connected to the terminals 121A and 122A of the antenna 120 via bumps 131 and 132.

The IC chip 130 is fixed on the front surface 110A of the base 110 by an underfill resin 133. This causes the terminals 121A and 122A of the antenna 120 to be electrically connected to the bumps 131 and 132, and the antenna 120 to be electrically connected to the IC chip 130.

The connecting portion 120A which connects the IC chip 130 and the antenna 120 as illustrated in FIGS. 2B and 2C corresponds to the terminals 121A and 122B and the bumps 131 and 132 that are enlarged in FIG. 3B.

In the following, the RFID tag 100 bent in the U-shape will be described with reference to FIG. 4.

Figure 4A:
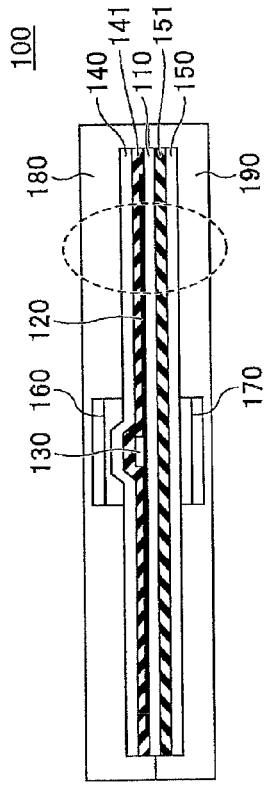
FIG. 4A is a diagram illustrating the cross section of the RFID tag.
Figure 4C:
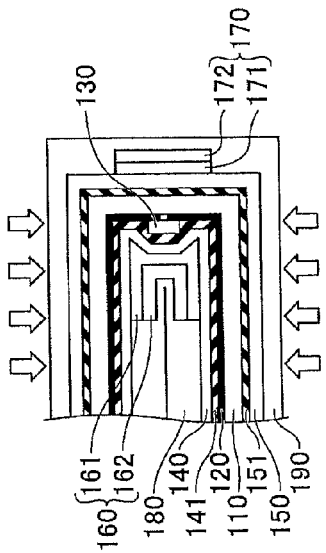
FIG. 4C is a diagram illustrating the cross section of the RFID tag which is bent around the IC chip in the U-shape.
Figure 4B:
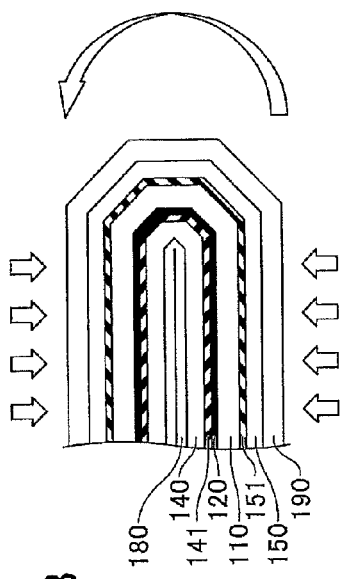
FIG. 4B is a diagram illustrating the cross section of the RFID tag which is bent in a U-shape at a portion indicated by dotted circle as illustrated in FIG. 4A.

FIG. 4A is a diagram illustrating the cross section of the RFID tag 100. FIG. 4B is a diagram illustrating the cross section of the RFID tag 100 which is bent in the U-shape at a portion indicated by dotted circle as illustrated in FIG. 4A. FIG. 4C is a diagram illustrating the cross section of the RFID tag 100 which is bent around the IC chip 130 in the U-shape. The cross section as illustrated in FIG. 4A is the same as the cross section as illustrated in FIG. 2B.

Figure 4E:
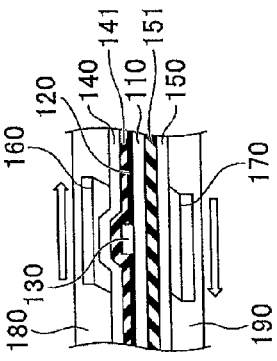
FIG. 4E is a diagram illustrating the cross section of the RFID tag in a state where the stress is applied on and around the IC chip in the direction of the width of the RFID tag.
Figure 4D:
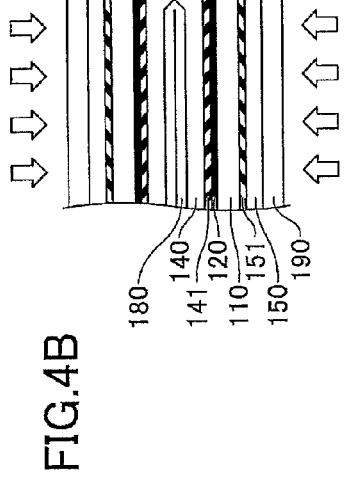
FIG. 4D is a diagram illustrating the cross section of the RFID tag in a state where stress is applied on and around the IC chip in the direction of the thickness of the RFID tag 100.

FIG. 4D is a diagram illustrating the cross section of the RFID tag 100 in a state where the stress is applied on and around the IC chip 130 in the direction of the thickness of the RFID tag 100. FIG. 4E is a diagram illustrating the cross section of the RFID tag 100 in a state where the stress is applied on and around the IC chip 130 in the direction of the width of the RFID tag 100.

As illustrated in FIG. 4B, the RFID tag 100 is bent at the portion indicated by the dotted circle as illustrated in FIG. 4A and the stress is applied on and around the IC chip 130 in the direction of the thickness of the RFID tag 100 as indicated by arrows. The portion indicated by the dotted circle is a portion located on the right side of the IC chip 130 as illustrated in FIG. 4A.

Since the inner covers 140 and 150 are formed of PET films and have certain strengths, deformation amounts of the inner covers 140 and 150 under the stress are less than that of the outer covers 180 and 190 having elasticity and flexibility. Accordingly, the inner covers 140 and 150 hold certain curvatures. Since the base 110 is formed of a PET film, the base 110 holds a certain curvature. The base 110 and the inner covers 140 and 150 have difficulties in being folded completely flat.

Therefore, it is suppressed that the antenna 120 is folded completely flat, and it becomes possible to suppress a breaking of the antenna 120.

As illustrated in FIG. 4C, the RFID tag 100 is bent in the U-shape around the IC chip 130 and in a direction in that the reinforcing member 160 is located inner side, and the stress is applied to the RFID tag 100 as indicated by arrows.

In this case, the reinforcing member 160 including the rubber sheet 161 and the film 162 is bent in the U-shape as illustrated in FIG. 4C, and the RFID tag 100 is not folded completely flat. This is because the film 162 formed of a thin PET film is not folded completely flat and holds a certain curvature and that the film 162 located inner side of the U-shape is held by the outer cover 180, since the film 162 is bent in the U-shape while pinching the outer cover 180 inside. Accordingly, the film 162 is not folded completely flat.

If the film 162 is bent in a state where the film 162 pinches the outer cover 180 inside, the thickness of the outer cover 180 which is being pressed by the stress is preserved between both edges of the film 162 which is formed of the PET film. Accordingly, the film 162 is not bent in a manner such that a distance between the both edges of the film 162 becomes less than the thickness of the outer cover 180 which is being pressed by the stress. The film 162 can be bent to an extent as described above.

When the RFID tag 100 is bent in the U-shape, the bump occurs on the inner cover 140 which is relatively pressed by the IC chip 130.

Since the rubber sheet 161 can be deformed by the stress, the rubber sheet 161 can absorb the bump which occurs on the inner cover 140.

As a result, the stress applied to the IC chip 130 and the connecting portion 120A of the IC chip 130 and the antenna 120 can be reduced by the rubber sheet 161. At the same time, since the film 162 holds a certain curvature, the stress is applied to the whole surfaces of the IC chip 130 almost evenly. Accordingly, it becomes possible to suppress occurrence of a local stress applied to the IC chip 130.

The reason why the occurrence of the local stress is suppressed is that the reinforcing member 160 including the rubber sheet 161 and the film 162 can be deformed in a manner as described above, and that the size of the reinforcing member 160 is greater than that of the IC chip 130 in plan view.

Accordingly, it becomes possible to suppress breakage of the IC chip 130 and the connecting portion 120A of the IC chip 130 and the antenna 120, if the RFID tag 100 is bent in the U-shape around the IC chip 130 in the direction so that the reinforcing member 160 is located inner side as illustrated in FIG. 4C.

Although, the RFID tag 100 which is bent in the U-shape around the IC chip 130 in the direction so that the reinforcing member 160 is located inner side is illustrated in FIG. 4C, the rubber sheet 171 and the film 172 reduce the stress applied to the IC chip 130 in a similar manner to that illustrated in FIG. 4C, in a case where the RFID tag 100 is bent in U-shape in a direction so that the reinforcing member 170 is located inner side.

Accordingly, it becomes possible to suppress breakage of the IC chip 130 and the connecting portion 120A of the IC chip 130 and the antenna 120, if the RFID tag 100 is bent in the U-shape around the IC chip 130 in the direction so that the reinforcing member 170 is located inner side in a manner similar to that illustrated in FIG. 4C.

In a case where the stress is applied to a peripheral portion of the IC chip 130 of the RFID tag 100 in the direction of the thickness of the RFID tag 100, the rubber sheet 161 deforms and absorbs a bump corresponding to the thickness of the IC chip 130.

Since the film 162 formed of the PET film has a larger surface than that of the IC chip 130 and the film 162 supports the stress applied to the IC chip 130, the stress is dispersed almost uniformly on the front surface of the IC chip 130.

In this situation, the rubber sheet 171 deforms in the direction of the thickness and absorbs the stress, and the film 172 disperses the stress almost uniformly which is applied from the bottom surface of the film 172.

Accordingly, the stress applied to the IC chip 130 is reduced or dispersed almost uniformly, and it becomes possible to suppress the breakage of the IC chip 130 and the connecting portion 120A of the IC chip 130 and the antenna 120.

As described above, the reason why the stress applied to the IC chip 130 is reduced or dispersed uniformly is that the size of the reinforcing member 160 is greater than that of the IC chip 130 in plan view. For example, in a case where the size of the reinforcing member 160 is four times greater than that of the IC chip 130 in plan view, the stress applied to the IC chip 130 is reduced to one fourth compared to a case where the reinforcing member 160 and the IC chip 130 have the same size.

Herein, in a case where the RFID tag 100 is bent in U-shape as illustrated in FIG. 4C, the stress applied to the IC chip 130 is reduced or dispersed in a similar manner to that described above with reference to FIG. 4D.

In FIG. 4E, stress is applied to a peripheral portion of the IC chip 130 of the RFID tag 100 in the direction of the width of the RFID tag 100. The stress in the direction of the width is applied to the RFID tag 100 as a shear stress as indicated by arrows.

In this case, since the rubber sheets 161 and 171 absorb the shear stress, it becomes possible to reduce the stress applied to the IC chip 130 and the connecting portion 120A of the IC chip 130 and the antenna 120.

As described above, the RFID tag 100 according to the present embodiment can reduce or disperse the stress applied to the IC chip 130 and the connecting portion 120A of the IC chip 130 and the antenna 120 in a case where the RFID tag 100 is bent in the U-shape as illustrated in FIG. 4B and in a case where the RFID tag 100 is bent in the U-shape around the IC chip 130 in the direction of the thickness of the RFID tag 100 as illustrated in FIG. 4C.

Further, the RFID tag 100 according to the present embodiment can reduce or disperse the stress applied to the IC chip 130 and the connecting portion 120A of the IC chip 130 and the antenna 120 in a case where the stress is applied to the RFID tag 100 in the direction of the thickness of the RFID tag 100 as illustrated in FIG. 4D and in a case where the shear stress is applied to the RFID tag 100 as illustrated in FIG. 4E.

Accordingly, it becomes possible to provide the RFID tag 100 which has very high durability and can suppress the breakage of the IC chip 130 and the connecting portion 120A by reducing the stress applied to the IC chip 130 and the connecting portion of the IC chip 130 and the antenna 120, if the RFID tag 100 is subjected to a harsh condition such as the press extraction, for example.

According to the present embodiment, it becomes possible to provide the RFID tag 100 which has very high durability.

Figure 5:
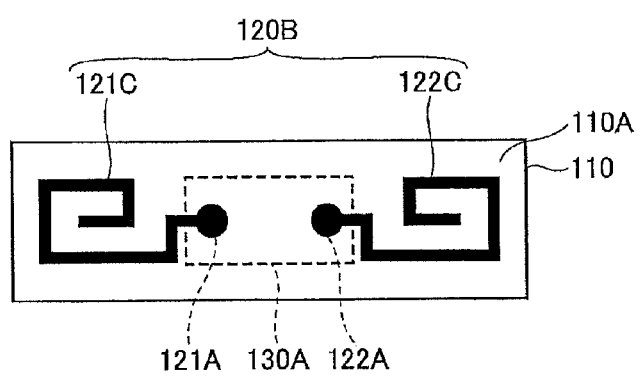
FIG. 5 is a diagram illustrating an antenna of the RFID tag according to a variation of the embodiment.

FIG. 5 is a diagram illustrating an antenna 120B of the RFID tag according to a variation of the present embodiment. The antenna 120B includes antenna portions 121C and 122C formed on the front surface 110A of the base 110. The antenna portions 121C and 122C are bent to have rectangular spiral patterns in plan view, respectively.

The antenna portions 121C and 122C have the same lengths as those of the antenna portions 121 and 122 as illustrated in FIG. 3A, respectively. The antenna 120B has similar configuration to that of the antenna 120 as illustrated in FIG. 3A except for the pattern in plan view.

Since the antenna portions 121C and 122C of the antenna 120B have the rectangular spiral patterns, it becomes possible to reduce the sizes of the base 110, the inner covers 140 and 150 and the outer covers 180 and 190 in plan view by utilizing the antenna 120B as illustrated in FIG. 5 instead of the antenna 120 as illustrated in FIG. 3A. The lateral length of the base 110 as illustrated in FIG. 5 is two third of that of the base 110 as illustrated in FIG. 3A.

The size of the RFID tag 100 may be reduced by utilizing the antenna 120B having the rectangular spiral shape in plan view as illustrated in FIG. 5.

Figure 6:
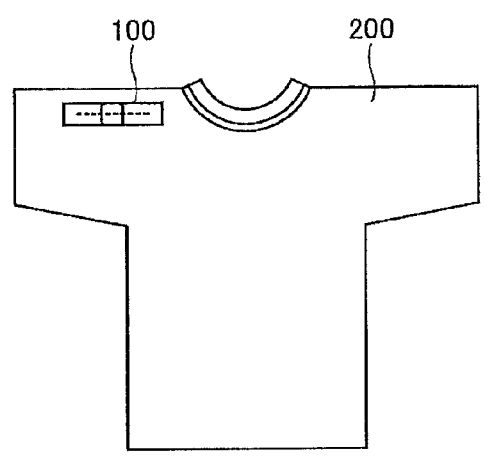
FIG. 6 is a diagram illustrating a T-shirt to which the RFID tag of the present embodiment is fitted.

FIG. 6 is a diagram illustrating a T-shirt 200 to which the RFID tag 100 of the present embodiment is fitted. The RFID tag 100 is fitted to the right shoulder portion of the T-shirt 200. The RFID tag 100 of the first embodiment may be fitted to the T-shirt 200 as illustrated in FIG. 6 or the laundry such as sheets or the like.

Figure 7:
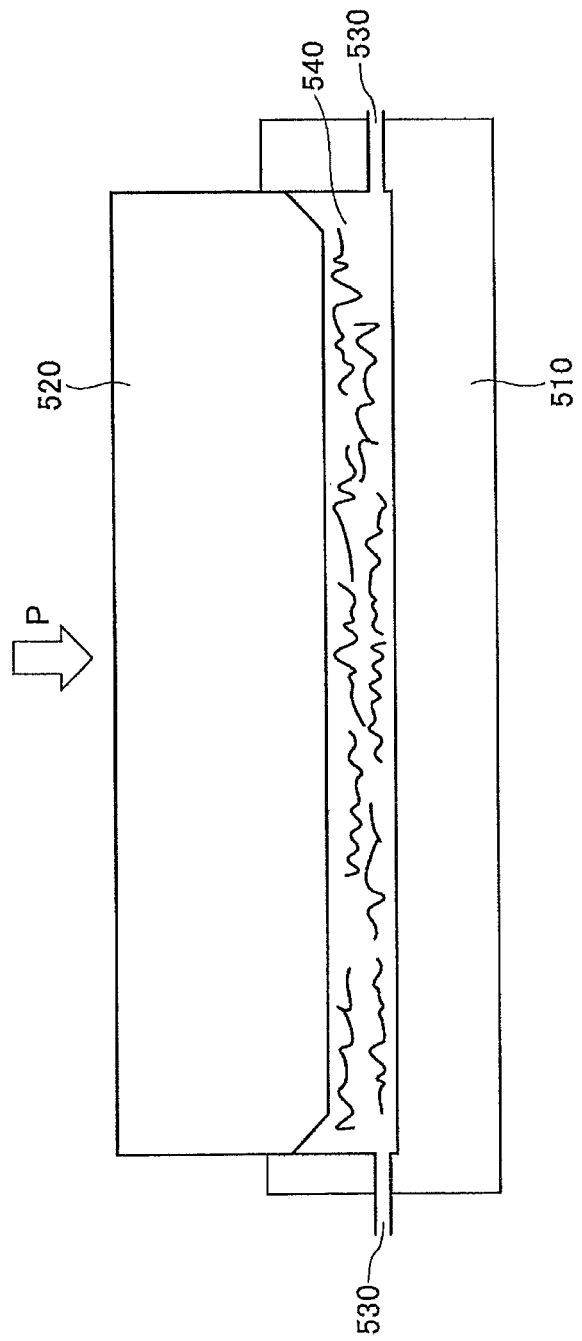
FIG. 7 is a diagram illustrating a dewaterer which performs the press extraction.

FIG. 7 is a diagram illustrating a dewaterer 500 which performs the press extraction.

The T-shirt 200 to which the RFID tag 100 is fitted may be dewatered by the dewaterer 500 after being washed by a washing machine.

The dewaterer 500 includes a cylinder 510, a press piston 520 and a drain outlet 530. A large amount of laundry 540 which is put into the cylinder 510 is being pressed by the press piston 520 in order to perform the press extraction and to dewater the laundry in a forcible manner. For example, the pressure ranging from 30 kgf/cm$^2$ to 50 kgf/cm$^2$ is applied to the laundry between the cylinder 510 and the press piston 520 during the press extraction. Water which is removed from the laundry 540 is drained via the drain outlet 530.

If the T-shirt 200 is included in the laundry 540 and the RFID tag 100 which is fitted to the T-shirt 200 is obliquely bent in U-shape and squashed, the IC chip 130 and the connecting portion 120A are protected by the reinforcing members 160 and 170. Thus, it becomes possible to suppress the breakage of the IC chip 130 and the connecting portion 120A if the T-shirt 200 is subjected to the press extraction.

Accordingly, it becomes possible to provide the RFID tag 100 which has very high durability and can suppress the breakage of the IC chip 130 and the connecting portion 120A, if the RFID tag 100 is subjected to the press extraction performed by the dewaterer 500, for example.

Accordingly, it becomes possible to provide the RFID tag 100 which has very high durability and can suppress the breakage of the IC chip 130 and the connecting portion 120A, if the RFID tag 100 is subjected to the press extraction performed by the dewaterer 500, for example.

In the embodiment as described above, the reinforcing member 160 which is one example of the first reinforcing member includes the rubber sheet 161 which is one example of the third sheet and the film 162 which is one example of the fourth sheet. In the embodiment as described above, the reinforcing member 170 which is one example of the second reinforcing member includes the rubber sheet 171 which is one example of the fifth sheet and the film 172 which is one example of the sixth sheet.

However, two adhesive sheets having flexibility may be used instead of the rubber sheets 161 and 171, respectively. Acrylic adhesive tapes may be used as the two adhesive sheets, for example.

In this case, the reinforcing member 160 which is one example of the first reinforcing member includes the acrylic adhesive tape which is one example of a first adhesive sheet and the rubber sheet 162 which is one example of the third sheet, and the reinforcing member 170 which is one example of the second reinforcing member includes the acrylic adhesive tape which is one example of a second adhesive sheet and the rubber sheet 172 which is one example of the fourth sheet.

The RFID tag according to the illustrative embodiment of present invention described above is not limited to the specific embodiments described herein, and variations and modifications may be made without departing from the scope of the present invention.

An RFID tag is provided, which has high durability.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An RFID tag comprising:

a base part having flexibility;

an antenna configured to be formed on a surface of the base part;

an IC chip configured to be mounted on the surface of the base part and electrically connected to the antenna;

a first sheet having flexibility and configured to cover the surface of the base part, the antenna and the IC chip;

a second sheet having flexibility and configured to cover another surface of the base part;

a first reinforcing member configured to include a third sheet and a fourth sheet and to cover the IC chip and a connecting portion of the IC chip and the antenna, the third sheet having flexibility and elasticity and being disposed on a surface of the first sheet, the fourth sheet having flexibility and being disposed on the third sheet;

a second reinforcing member configured to include a fifth sheet and a sixth sheet and to cover the IC chip and the connecting portion of the IC chip and the antenna, the fifth sheet having flexibility and elasticity and being disposed on a surface of the second sheet, the sixth sheet having flexibility and being disposed on the fifth sheet; and an outer member having flexibility and elasticity and being configured to cover the first sheet, the second sheet, the first reinforcing member and the second reinforcing member, wherein a thickness of the third sheet is greater than or equal to a thickness of the IC chip, and a thickness of the fifth sheet is greater than or equal to the thickness of the IC chip, and wherein sizes of the first sheet and the second sheet are equal to a size of the base part in plan view, and larger than sizes of the third sheet, the fourth sheet, the fifth sheet and the sixth sheet in plan view.

2. The RFID tag as claimed in claim 1, wherein the IC chip is disposed in a center portion of the first reinforcing member and the second reinforcing member in plan view.

3. The RFID tag as claimed in claim 2, wherein sizes of the first reinforcing member and the second reinforcing member are four times as large as or more than four times larger than a size of the IC chip in plan view.

4. The RFID tag as claimed in claim 1, wherein
the outer member includes a first concave portion and a second concave portion, and
the first reinforcing member and the second reinforcing member are disposed in the first concave portion and the second concave portion, respectively.

5. An RFID tag comprising:
a base part having flexibility;
an antenna configured to be formed on a surface of the base part;
an IC chip configured to be mounted on the surface of the base part and electrically connected to the antenna;

a first sheet having flexibility and configured to cover the surface of the base part, the antenna and the IC chip;

a second sheet having flexibility and configured to cover another surface of the base part;

a first reinforcing member configured to include a first adhesive layer and a third sheet and to cover the IC chip and a connecting portion of the IC chip and the antenna, the first adhesive layer having flexibility and being disposed on a surface of the first sheet, the third sheet having flexibility and being disposed on the first adhesive layer;

a second reinforcing member configured to include a second adhesive layer and a fourth sheet and to cover the IC chip and the connecting portion of the IC chip and the antenna, the second adhesive layer having flexibility and being disposed on a surface of the second sheet, the fourth sheet having flexibility and being disposed on the second adhesive layer; and an outer member having flexibility and elasticity and being configured to cover the first sheet, the second sheet, the first reinforcing member and the second reinforcing member, wherein a thickness of the first adhesive layer is greater than or equal to a thickness of the IC chip, and a thickness of the second adhesive layer is greater than or equal to the thickness of the IC chip, and wherein sizes of the first sheet and the second sheet are equal to a size of the base part in plan view, and larger than sizes of the first adhesive layer, the third sheet, the second adhesive layer and the fourth sheet in plan view.

6. The RFID tag as claimed in claim 5, wherein the IC chip is disposed in a center portion of the first reinforcing member and the second reinforcing member in plan view.

7. The RFID tag as claimed in claim 6, wherein sizes of the first reinforcing member and the second reinforcing member are four times as large as or more than four times larger than a size of the IC chip in plan view.

8. The RFID tag as claimed in claim 5, wherein
the outer member includes a first concave portion and a second concave portion, and
the first reinforcing member and the second reinforcing member are disposed in the first concave portion and the second concave portion, respectively.

* * * * *

UNITED STATES PATENT AND TRADEMARK OFFICE
CERTIFICATE OF CORRECTION

PATENT NO. : 8,876,007 B2  
APPLICATION NO. : 13/827088  
DATED : November 4, 2014  
INVENTOR(S) : Shunji Baba et al.

Page 1 of 1

It is certified that error appears in the above-identified patent and that said Letters Patent is hereby corrected as shown below:

On the Title Page

Column 1, Item [73] (Assignees), Line 1, Delete "Kawaski" and insert -- Kawasaki --, therefor.

Signed and Sealed this  
Third Day of March, 2015

Michelle K. Lee  
*Deputy Director of the United States Patent and Trademark Office*